United States Patent
Wooden

(10) Patent No.: US 11,850,193 B2
(45) Date of Patent: Dec. 26, 2023

(54) WHEELCHAIR SHIELDING DEVICE

(71) Applicant: Devon Wooden, Brooklyn, NY (US)

(72) Inventor: Devon Wooden, Brooklyn, NY (US)

(*) Notice: Subject to any disclaimer, the term of this patent is extended or adjusted under 35 U.S.C. 154(b) by 218 days.

(21) Appl. No.: 17/363,505

(22) Filed: Jun. 30, 2021

(65) Prior Publication Data
US 2023/0000699 A1   Jan. 5, 2023

(51) Int. Cl.
A61G 5/10 (2006.01)
B62B 5/00 (2006.01)
A47C 7/66 (2006.01)

(52) U.S. Cl.
CPC ............... A61G 5/10 (2013.01); A47C 7/666 (2018.08); B62B 5/0013 (2013.01); A61G 2203/70 (2013.01)

(58) Field of Classification Search
CPC ........ A61G 5/10; A61G 2203/70; A47C 7/66; A47C 7/666; B62B 3/1436; B62B 5/0013; B62B 9/14; B62B 9/145; B62B 9/147
See application file for complete search history.

(56) References Cited

U.S. PATENT DOCUMENTS

| | | | | |
|---|---|---|---|---|
| 1,413,657 A | * | 4/1922 | Gates | B60J 1/2013 160/31 |
| 4,643,479 A | * | 2/1987 | Servi | A61G 5/10 D12/133 |
| 5,168,889 A | * | 12/1992 | Diestel | A61G 5/10 135/161 |
| 5,203,363 A | * | 4/1993 | Kidwell | A61G 5/10 135/96 |
| 5,921,258 A | | 7/1999 | Francois | |
| 7,140,678 B1 | | 11/2006 | Grant | |
| 7,316,450 B2 | | 1/2008 | Ayers | |
| 7,585,020 B1 | * | 9/2009 | Wahl, Jr. | A47C 7/66 297/184.15 |
| 7,861,735 B2 | | 1/2011 | Stepaniuk | |
| 8,997,770 B1 | * | 4/2015 | Martin | A47C 7/666 135/88.13 |
| 9,468,572 B2 | * | 10/2016 | Schulke | A61G 5/1094 |
| 9,481,232 B2 | * | 11/2016 | Lee | B60J 5/0487 |
| 9,649,235 B1 | | 5/2017 | McComb-Jones | |
| 9,675,507 B1 | | 6/2017 | Wilson-Hunter | |
| 9,795,526 B2 | * | 10/2017 | Davis | A61G 5/10 |
| 9,943,171 B1 | * | 4/2018 | Simpson | A61G 5/10 |

(Continued)

FOREIGN PATENT DOCUMENTS

| | | | |
|---|---|---|---|
| CN | 107049623 A | * | 8/2017 |
| GB | 2261408 A | * | 5/1993 |

(Continued)

Primary Examiner — Steve Clemmons

(57) ABSTRACT

A wheelchair shielding device for shielding a wheelchair user from one or more of precipitation and sunlight includes a framework and a canopy. The framework is mountable to a frame of a wheelchair so that the framework extends upwardly from a rear of the wheelchair. The canopy is hingedly engaged to an upper end of the framework and is selectively positionable in a stowed configuration and a deployed configuration. In the stowed configuration, the canopy is substantially parallel to and in abutment with the framework. In the deployed configuration, the canopy extends above a seat of the wheelchair and shields a user positioned upon the seat from one or more of precipitation and sunlight.

12 Claims, 7 Drawing Sheets

(56) References Cited

U.S. PATENT DOCUMENTS

| | | | | |
|---|---|---|---|---|
| 2006/0237932 A1* | 10/2006 | Moore | ............... | B62B 9/10 |
| | | | | 280/47.41 |
| 2008/0011345 A1* | 1/2008 | Mohns | ............... | A61G 5/10 |
| | | | | 135/88.01 |
| 2008/0018146 A1* | 1/2008 | Wahl | ............... | A47C 7/66 |
| | | | | 297/184.15 |
| 2008/0185028 A1* | 8/2008 | Ayers | ............... | A61G 5/10 |
| | | | | 135/88.13 |
| 2011/0297198 A1* | 12/2011 | Sibley | ............... | A61G 15/10 |
| | | | | 135/88.01 |
| 2012/0192905 A1* | 8/2012 | Boss | ............... | A47C 7/666 |
| | | | | 135/141 |
| 2014/0265462 A1* | 9/2014 | Fleming | ............... | A47C 1/143 |
| | | | | 297/180.14 |
| 2015/0296990 A1 | 10/2015 | Malik | | |
| 2017/0254109 A1* | 9/2017 | Colbo | ............... | B60J 7/12 |

FOREIGN PATENT DOCUMENTS

| | | | | | |
|---|---|---|---|---|---|
| GB | 2423058 | A | * | 8/2006 | |
| JP | 2004113722 | A | * | 4/2004 | ............ A61G 5/10 |
| KR | 200414857 | Y1 | * | 4/2006 | |
| KR | 20100000424 | U | * | 1/2010 | |
| KR | 101438665 | B1 | * | 9/2014 | |
| KR | 200474244 | Y1 | * | 9/2014 | |
| KR | 20150144081 | A | * | 12/2015 | |
| KR | 20180020837 | A | * | 2/2018 | |
| KR | 101936807 | B1 | * | 1/2019 | |
| KR | 20190041568 | A | * | 4/2019 | |

\* cited by examiner

WHEELCHAIR SHIELDING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to shielding devices and more particularly pertains to a new shielding device for shielding a wheelchair user from one or more of precipitation and sunlight. The present invention discloses a shielding device for a wheelchair comprising a selectively deployable canopy to which a set of roller panels is engaged. Selective deployment of the canopy and extension of the roller panels provides a temporary shelter over the wheelchair and its user.

(2) Description of Related Art Including Information Disclosed Under 37 CFR 1.97 and 1.98

The prior art relates to shielding devices for wheelchairs and generally comprise canopies that can be extended to shield a user from overhead precipitation. These prior art shielding devices do not shield the user from laterally motivated precipitation, such as would be encountered with wind.

BRIEF SUMMARY OF THE INVENTION

An embodiment of the disclosure meets the needs presented above by generally comprising a framework and a canopy. The framework is configured to be mountable to a frame of a wheelchair so that the framework extends upwardly from a rear of the wheelchair. The canopy is hingedly engaged to an upper end of the framework and is selectively positionable in a stowed configuration and a deployed configuration. In the stowed configuration, the canopy is substantially parallel to and in abutment with the framework. In the deployed configuration, the canopy extends above a seat of the wheelchair and is configured to shield a user positioned upon the seat from one or more of precipitation and sunlight.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
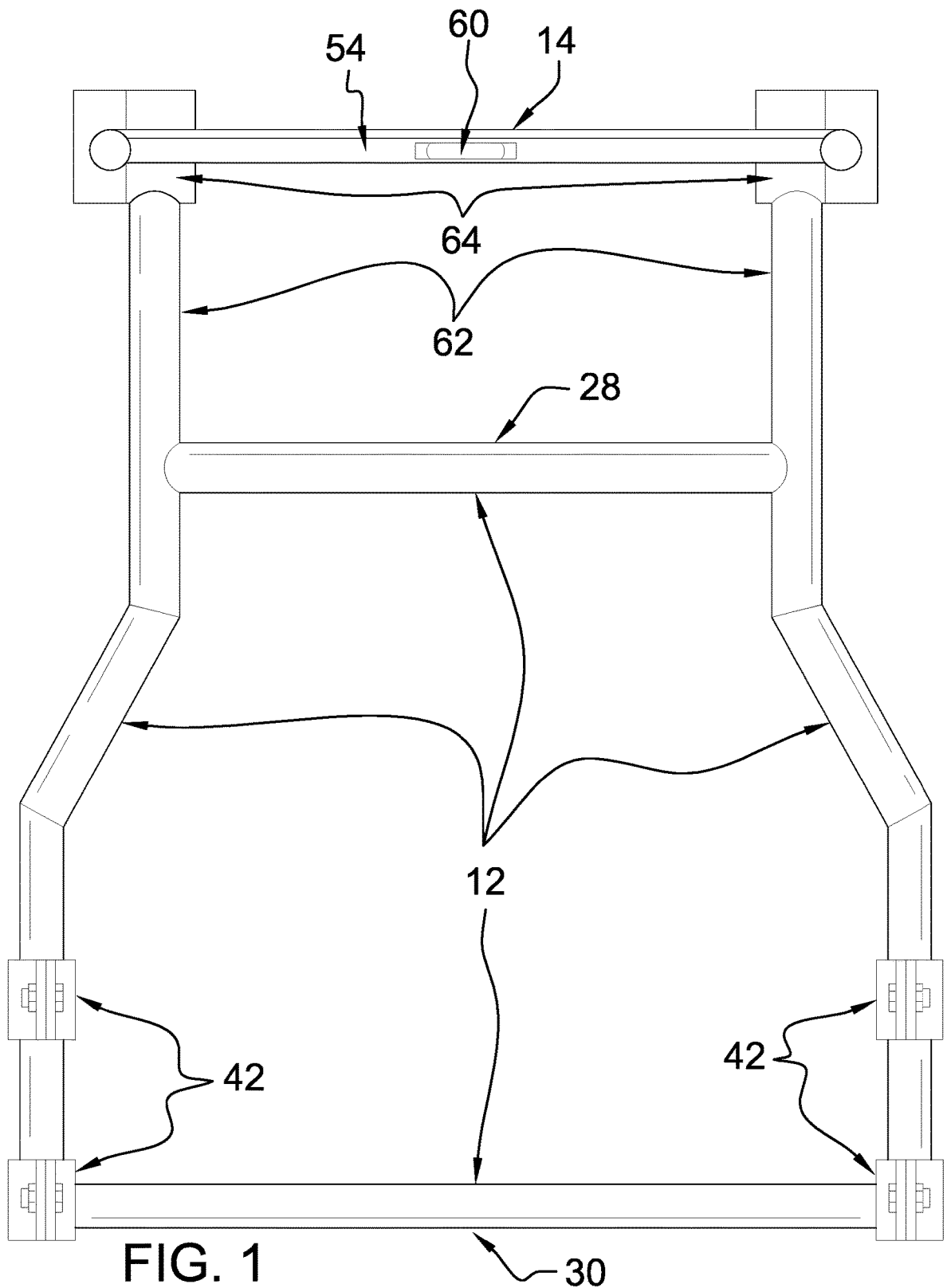
FIG. 1 is a front view of a wheelchair shielding device according to an embodiment of the disclosure.
Figure 2:
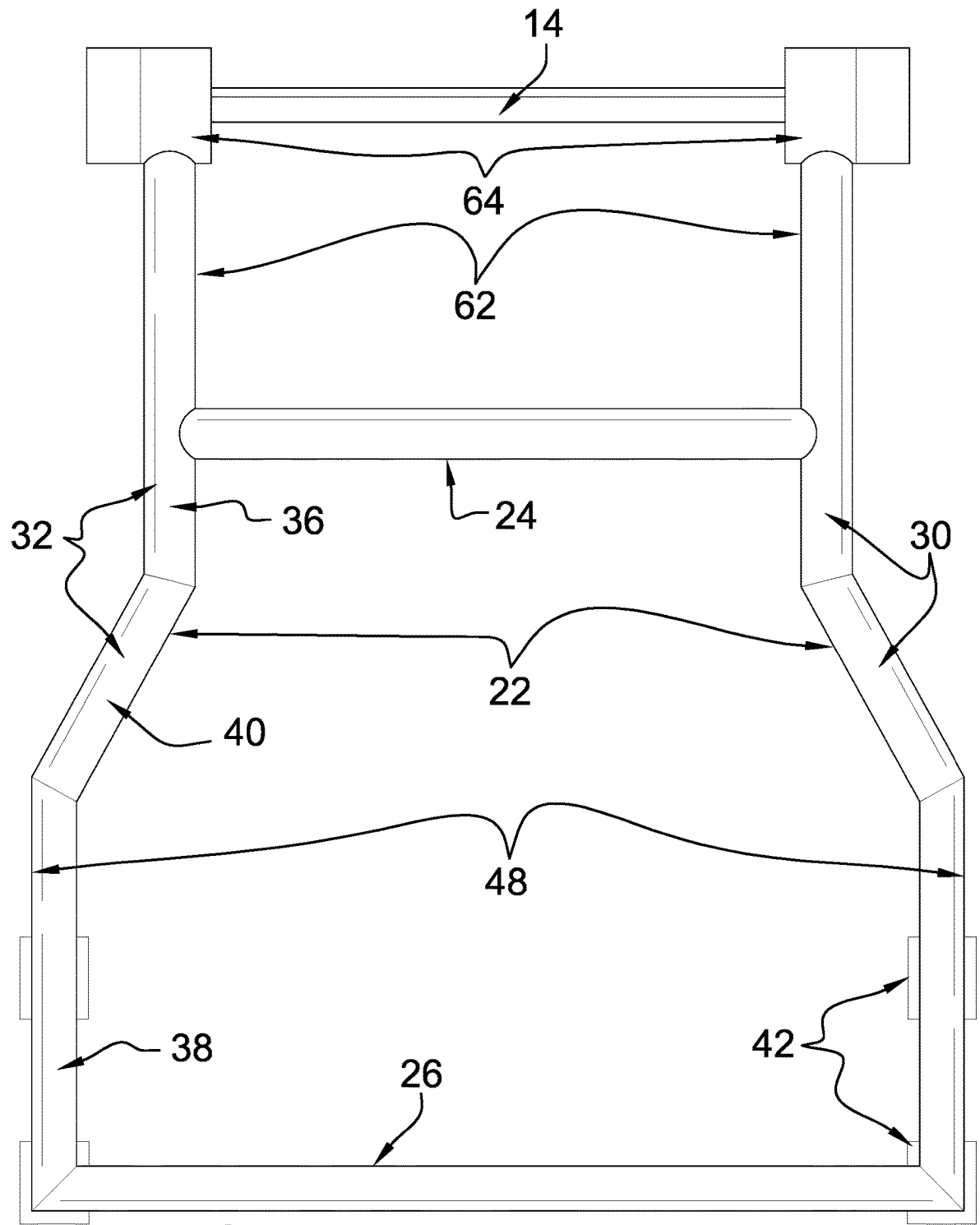
FIG. 2 is a rear view of an embodiment of the disclosure.

With reference now to the drawings, and in particular to FIGS. 1 through 7 thereof, a new shielding device embodying the principles and concepts of an embodiment of the disclosure and generally designated by the reference numeral 10 will be described.

Figure 6:
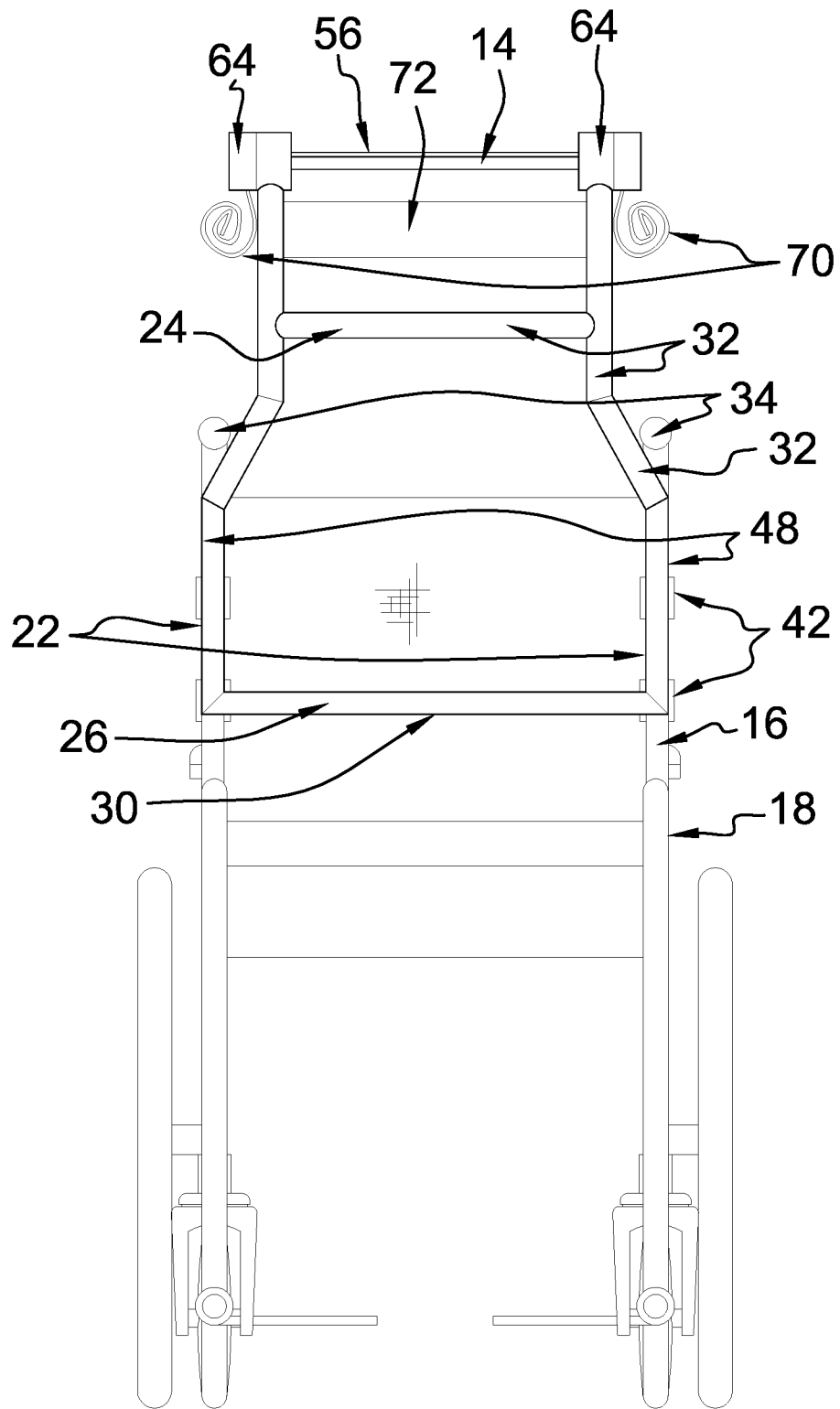
FIG. 6 is an in-use view of an embodiment of the disclosure.

As best illustrated in FIGS. 1 through 7, the wheelchair shielding device 10 generally comprises a framework 12 and a canopy 14. The framework 12 is configured to be mountable to a frame 16 of a wheelchair 18 so that the framework 12 extends upwardly from a rear 20 of the wheelchair 18. The framework 12 comprises a pair of siderails 22, a top rail 24, and a bottom rail 26. The top rail 24 is engaged to and extends between the siderails 22 defining an upper end 28 of the framework 12. The bottom rail 26 is engaged to and extends between the siderails 22 defining a lower end 30 of the framework 12. The bottom rail 26 may be dimensionally longer than the top rail 24, as shown in FIG. 1. Thus configured, an upper section 32 of the framework 12 is configured to be positioned between push handles 34 that extend from the rear 20 of the wheelchair 18, as shown in FIG. 6.

Each siderail 22 may comprise an upper segment 36, a lower segment 38, and a medial segment 40. The upper segment 36 is engaged to and extends perpendicularly from the top rail 24. The lower segment 38 is engaged to and extends perpendicularly from the bottom rail 26. The medial segment 40 is engaged to and extends transversely between the upper segment 36 and the lower segment 38.

Figure 3:
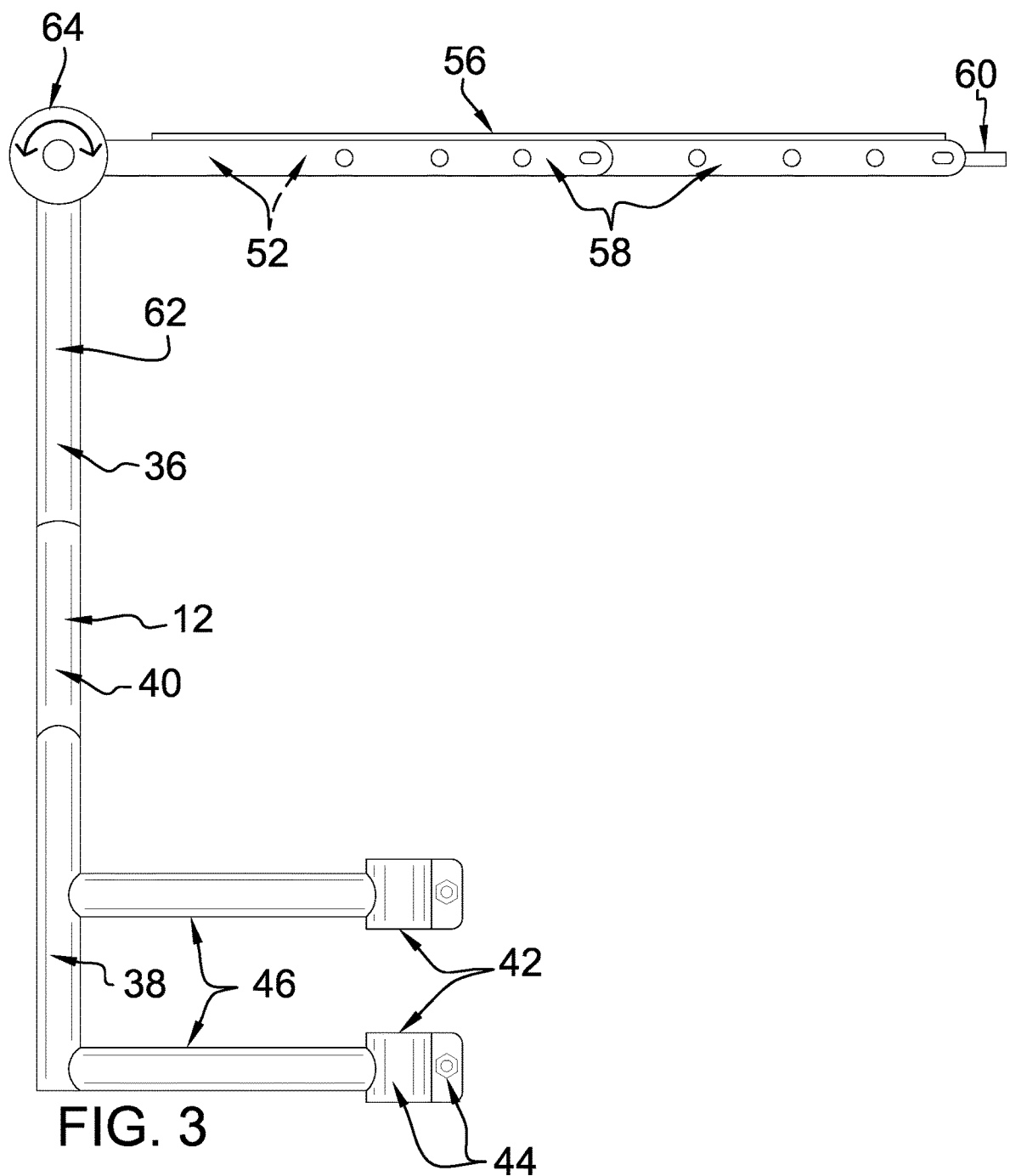
FIG. 3 is a side view of an embodiment of the disclosure.
Figure 4:
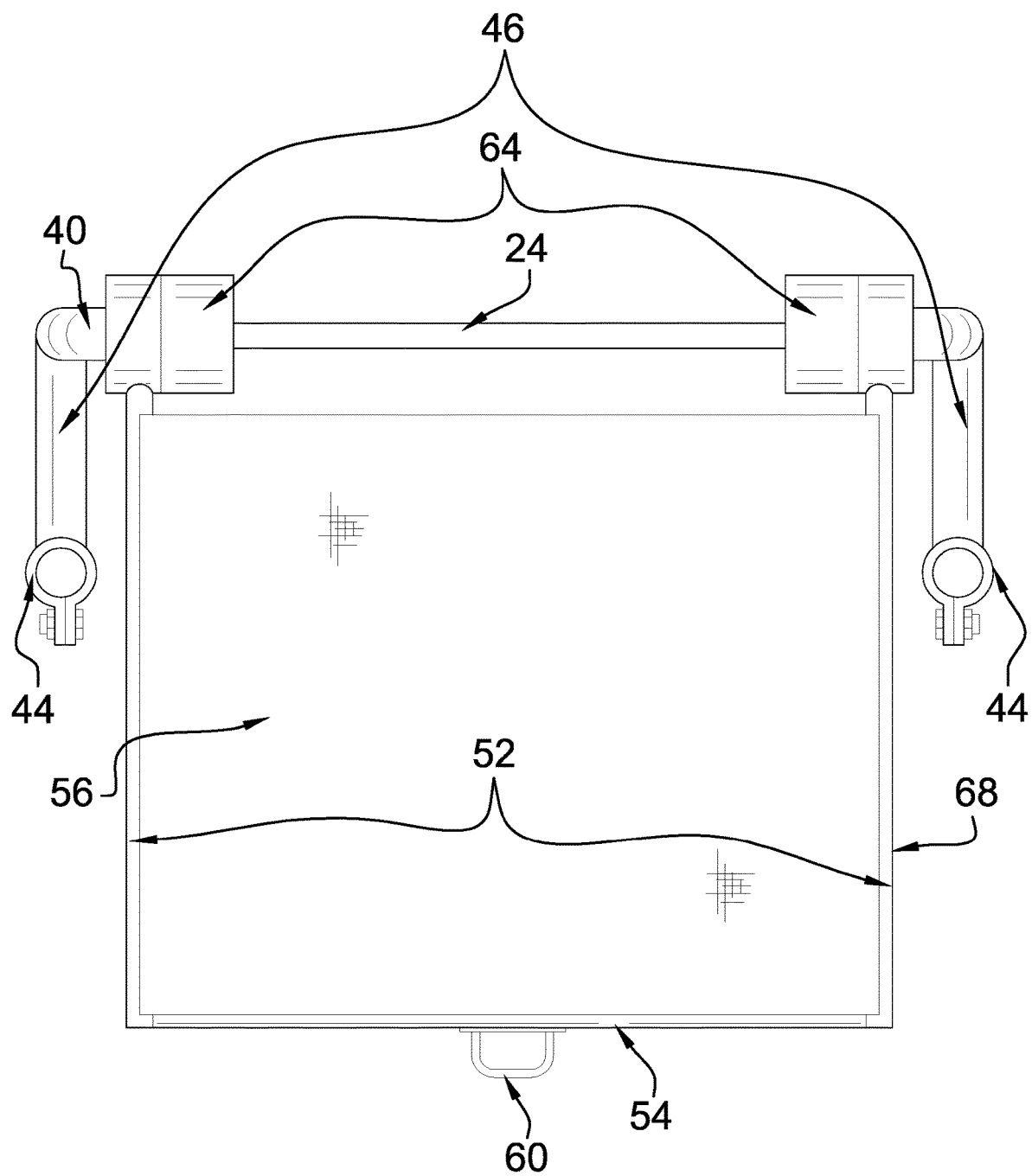
FIG. 4 is a top view of an embodiment of the disclosure.
Figure 5:
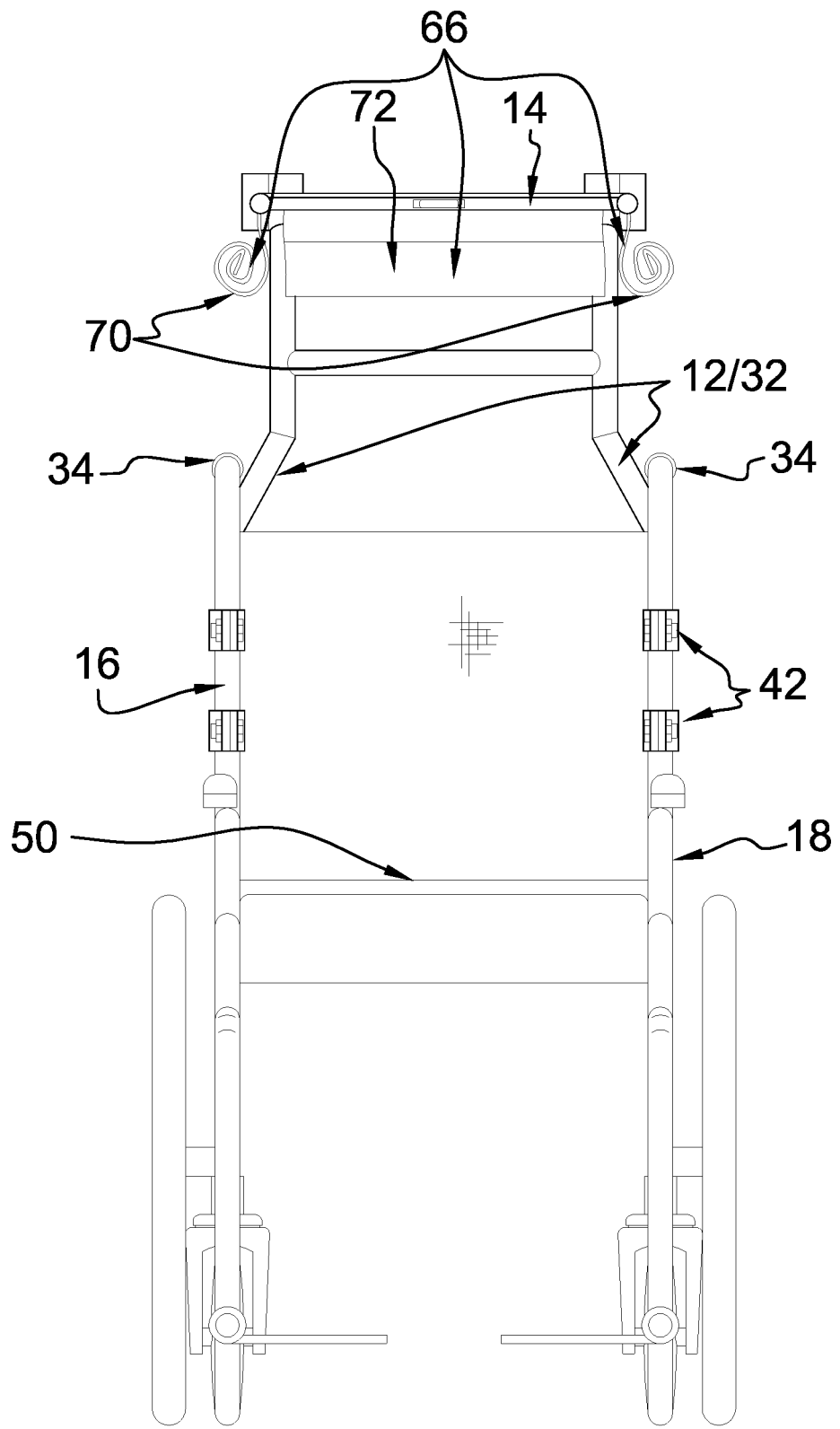
FIG. 5 is an in-use view of an embodiment of the disclosure.

A plurality of connectors 42 is engaged to the framework 12 proximate to the lower end 30 of the framework 12. The connectors 42 are configured to selectively engage the frame 16 of the wheelchair 18 so that the framework 12 is removably engaged to the wheelchair 18. Each connector 42 may comprise a tube clamp 44, as shown in FIG. 3, or other connecting means, such as, but not limited to, quick connects, piping clamps, and the like.

Each of a plurality of rods 46 is engaged to and positioned between the framework 12 and a respective connector 42 so that the framework 12 is offset from the rear 20 of the wheelchair 18. The plurality of rods 46 comprise four rods 46 positioned two apiece on opposed sides 48 of the framework 12. The rods 46 extend substantially perpendicularly from the framework 12 so that the framework 12 is substantially parallel to the rear 20 of the wheelchair 18.

The canopy 14 is hingedly engaged to the upper end 28 of the framework 12 and is selectively positionable in a stowed configuration and a deployed configuration. In the stowed configuration, the canopy 14 is substantially parallel to and in abutment with the framework 12. In the deployed configuration, the canopy 14 extends above a seat 50 of the wheelchair 18 and is configured to shield a user positioned upon the seat 50 from one or more of precipitation and sunlight.

The canopy 14 comprises a pair of sidebars 52, an end bar 54, and a canvas 56. Each sidebar 52 may comprise a pair of nested sections 58 so that the sidebar 52 is selectively extensible. The end bar 54 is engaged to and extends between the sidebars 52 distal from the framework 12. The canvas 56 is engaged to and extends between the sidebars 52.

A handle 60 is engaged to the end bar 54 and is configured to be grasped in a hand of the user, positioning the user to selectively extend the sidebars 52. The present invention anticipates a pair of first actuators (not shown but comprising servomotors, linear actuators, and the like) being engaged with nested sections 58 for selectively extending the sidebars 52.

Figure 7:
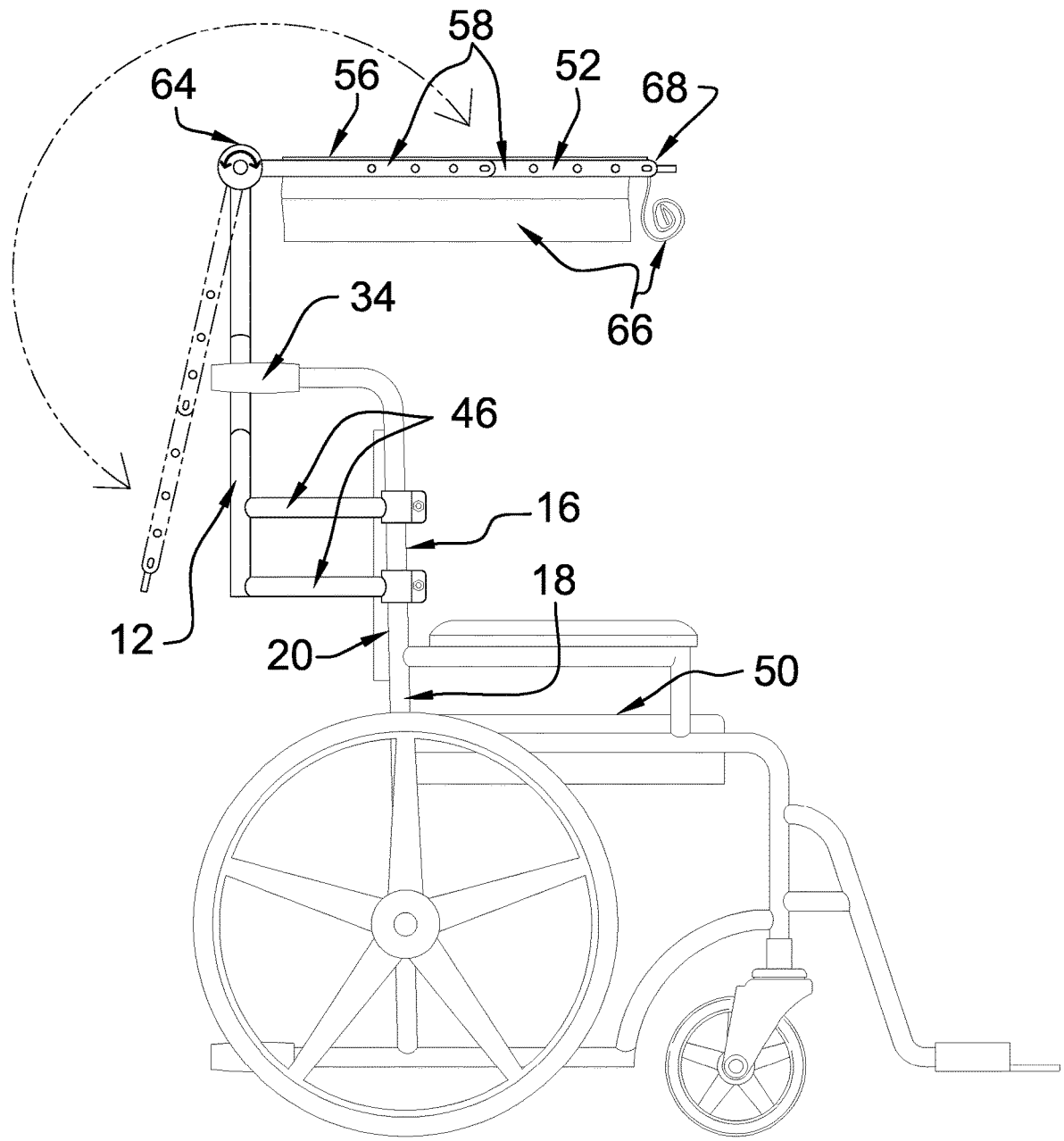
FIG. 7 is an in-use view of an embodiment of the disclosure.

Each of a pair of posts 62 is engaged to and extends from the upper end 28 of the framework 12, such that the pair of posts 62 and the framework 12 are substantially coplanar. Each of a pair of hinges 64 is operationally engaged a respective post 62 and the canopy 14. The hinges 64 are configured for 270° hinging of the canopy 14 relative to the framework 12, as shown in FIG. 7. The present invention anticipates a pair of second actuators (not shown but comprising servomotors and the like) engaged to the hinges 64 and being configured for selectively motivating the canopy 14 between the stowed configuration and the deployed configuration.

A set of roller panels 66 is engaged to a perimeter 68 of the canopy 14. Each roller panel 66 is selectively extensible from a rolled position to a deployed position. In the deployed position, the roller panel 66 extends from the canopy 14 to proximate to the seat 50 of the wheelchair 18. The set of roller panels 66 is configured to shield the user positioned on the seat 50 of the wheelchair 18. The roller panels 66 are transparent so that the user can see through the roller panels 66. The roller panels 66 may be spring loaded or clutch driven such that the roller panels 66 are biased to the rolled position. The present invention anticipates the roller panels 66 being weighted to help them remain in position when exposed to wind. The set of roller panels 66 comprises a pair of side screens 70, which are engaged singly to the sidebars 52, and a front screen 72, which is engaged to the end bar 54.

In use, the canopy 14 and the roller panels 66 are selectively deployable in inclement weather to protect the user from exposure to rain, snow, and the like, when other sheltering options are not available. The wheelchair shielding device 10, unlike an umbrella, shields the user without requiring use of their hands, thus freeing their hands for other tasks, such as rolling or otherwise operating the wheelchair 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A wheelchair shielding device comprising:
    a framework configured to be mountable to a frame of a wheelchair, such that the framework extends upwardly from a rear of the wheelchair;
    a canopy hingedly engaged to an upper end of the framework, such that the canopy is selectively positionable in a stowed configuration, wherein the canopy is substantially parallel to and in abutment with the framework, and a deployed configuration, wherein the canopy extends above a seat of the wheelchair, wherein the canopy is configured for shielding a user positioned upon the seat from one or more of precipitation and sunlight;
    wherein the framework comprises:
        a pair of siderails;
        a top rail engaged to and extending between the siderails defining the upper end of the framework; and
        a bottom rail engaged to and extending between the siderails defining a lower end of the framework, wherein the bottom rail is dimensionally longer than the top rail, wherein an upper section of the framework is configured for positioning in alignment between push handles extending from the rear of the wheelchair;
    a plurality of connectors engaged to the framework proximate to the lower end of the framework, the connectors being configured for selectively engaging the frame of the wheelchair, such that the framework is removably engaged to the wheelchair;
    a plurality of rods, each rod being engaged to and positioned between the framework and a respective connector, such that the framework is rearwardly offset from the rear of the wheelchair; and wherein each siderail comprises
an upper segment engaged to and extending perpendicularly from the top rail;
a lower segment engaged to and extending perpendicularly from the bottom rail; and
a medial segment engaged to and extending between the upper segment and the lower segment, the medial segment being angled such that the lower segment is configured to be coplanar with and perpendicular to an associated one of the push handles of the wheelchair, the medial segment is positioned between the push handles of the wheelchair, and the upper segment is positioned vertically above the push handles of the wheelchair.

2. The wheelchair shielding device of claim 1, wherein each connector comprises a tube clamp.

3. The wheelchair shielding device of claim 1, wherein the plurality of rods comprises four rods positioned two apiece on opposed sides of the framework, the rods extending substantially perpendicularly from the framework, such that the framework is substantially parallel to the rear of the wheelchair.

4. The wheelchair shielding device of claim 1, wherein the canopy comprises:
a pair of sidebars;
an end bar engaged to and extending between the sidebars distal from the framework, and
a canvas engaged to and extending between the sidebars.

5. The wheelchair shielding device of claim 4, wherein each sidebar comprises a pair of nested sections, such that the sidebar is selectively extensible.

6. The wheelchair shielding device of claim 5, further including a handle engaged to the end bar and being configured for grasping in a hand of the user, positioning the user for selectively extending the sidebars.

7. The wheelchair shielding device of claim 4, further including a set of roller panels engaged to a perimeter of the canopy, such that each roller panel is selectively extensible from a rolled position to a deployed position, wherein the roller panel extends from the canopy to proximate to the seat of the wheelchair, wherein the set of roller panels is configured for shielding the user positioned on the seat of the wheelchair, the set of roller panels comprising:
a pair of side screens engaged singly to the sidebars, and
a front screen engaged to the end bar.

8. The wheelchair shielding device of claim 1, further including:
a pair of posts, each post being engaged to and extending from the upper end of the framework, such that the pair of posts and the framework are substantially coplanar, and
a pair of hinges, each hinge being operationally engaged a respective post and the canopy, the hinge being configured for 270° hinging of the canopy relative to the framework.

9. The wheelchair shielding device of claim 1, further including a set of roller panels engaged to a perimeter of the canopy, such that each roller panel is selectively extensible from a rolled position to a deployed position, wherein the roller panel extends from the canopy to proximate to the seat of the wheelchair, wherein the set of roller panels is configured for shielding the user positioned on the seat of the wheelchair.

10. The wheelchair shielding device of claim 9, wherein the roller panels are transparent, such that the user can see through the roller panels.

11. A wheelchair shielding system comprising:
a wheelchair comprising a frame;
a framework mounted to the frame, such that the framework extends upwardly from a rear of the wheelchair;
a canopy hingedly engaged to an upper end of the framework, such that the canopy is selectively positionable in a stowed configuration, wherein the canopy is substantially parallel to and in abutment with the framework, and a deployed configuration, wherein the canopy extends above a seat of the wheelchair, wherein the canopy is configured for shielding a user positioned upon the seat from one or more of precipitation and sunlight;
the framework comprising:
a pair of siderails,
a top rail engaged to and extending between the siderails defining an upper end of the framework, and
a bottom rail engaged to and extending between the siderails defining a lower end of the framework, the bottom rail being dimensionally longer than the top rail, such that an upper section of the framework is positioned in alignment between push handles extending from the rear of the wheelchair, each siderail comprising:
an upper segment engaged to and extending perpendicularly from the top rail,
a lower segment engaged to and extending perpendicularly from the bottom rail, and
a medial segment engaged to and extending between the upper segment and the lower segment, the medial segment being angled such that the lower segment is configured to be coplanar with and perpendicular to an associated one of the push handles of the wheelchair, the medial segment is positioned between the push handles of the wheelchair, and the upper segment is positioned vertically above the push handles of the wheelchair;
a plurality of rods, each rod being engaged to and positioned between the framework and a respective connector, such that the framework is offset from the rear of the wheelchair, the plurality of rods comprising four rods positioned two apiece on opposed sides of the framework, the rods extending substantially perpendicularly from the framework, such that the framework is substantially parallel to the rear of the wheelchair;
the canopy comprising:
a pair of sidebars, each sidebar comprising a pair of nested sections, such that the sidebar is selectively extensible,
an end bar engaged to and extending between the sidebars distal from the framework, and
a canvas engaged to and extending between the sidebars;
a handle engaged to the end bar and being configured for grasping in a hand of the user, positioning the user for selectively extending the sidebars;
a pair of posts, each post being engaged to and extending from the upper end of the framework, such that the pair of posts and the framework are substantially coplanar,
a pair of hinges, each hinge being operationally engaged a respective post and the canopy, the hinge being configured for 270° hinging of the canopy relative to the framework; and
a set of roller panels engaged to a perimeter of the canopy, such that each roller panel is selectively extensible from a rolled position to a deployed position, wherein the roller panel extends from the canopy to proximate to the seat of the wheelchair, wherein the set of roller panels is configured for shielding the user positioned on the seat of the wheelchair, the roller panels being transparent, such that the user can see through the roller panels, the set of roller panels comprising:
a pair of side screens engaged singly to the sidebars, and
a front screen engaged to the end bar.

12. A wheelchair shielding device comprising:
a framework configured to be mountable to a frame of a wheelchair, such that the framework extends upwardly from a rear of the wheelchair, the framework comprising:
a pair of siderails,
a top rail engaged to and extending between the siderails defining an upper end of the framework, and
a bottom rail engaged to and extending between the siderails defining a lower end of the framework, the bottom rail being dimensionally longer than the top rail, wherein an upper section of the framework is configured for positioning in alignment between push handles extending from the rear of the wheelchair, each siderail comprising:
an upper segment engaged to and extending perpendicularly from the top rail,
a lower segment engaged to and extending perpendicularly from the bottom rail, and
a medial segment engaged to and extending between the upper segment and the lower segment, the medial segment being angled such that the lower segment is configured to be coplanar with and perpendicular to an associated one of the push handles of the wheelchair, the medial segment is positioned between the push handles of the wheelchair, and the upper segment is positioned vertically above the push handles of the wheelchair;
a plurality of connectors engaged to the framework proximate to the lower end of the framework, the connectors being configured for selectively engaging the frame of the wheelchair, such that the framework is removably engaged to the wheelchair, each connector comprising a tube clamp;
a plurality of rods, each rod being engaged to and positioned between the framework and a respective connector, such that the framework is offset from the rear of the wheelchair, the plurality of rods comprising four rods positioned two apiece on opposed sides of the framework, the rods extending substantially perpendicularly from the framework, such that the framework is substantially parallel to the rear of the wheelchair;
a canopy hingedly engaged to the upper end of the framework, such that the canopy is selectively positionable in a stowed configuration, wherein the canopy is substantially parallel to and in abutment with the framework, and a deployed configuration, wherein the canopy extends above a seat of the wheelchair, wherein the canopy is configured for shielding a user positioned upon the seat from one or more of precipitation and sunlight, the canopy comprising:
a pair of sidebars, each sidebar comprising a pair of nested sections, such that the sidebar is selectively extensible,
an end bar engaged to and extending between the sidebars distal from the framework, and
a canvas engaged to and extending between the sidebars;
a handle engaged to the end bar and being configured for grasping in a hand of the user, positioning the user for selectively extending the sidebars;
a pair of posts, each post being engaged to and extending from the upper end of the framework, such that the pair of posts and the framework are substantially coplanar,
a pair of hinges, each hinge being operationally engaged a respective post and the canopy, the hinge being configured for 270° hinging of the canopy relative to the framework; and
a set of roller panels engaged to a perimeter of the canopy, such that each roller panel is selectively extensible from a rolled position to a deployed position, wherein the roller panel extends from the canopy to proximate to the seat of the wheelchair, wherein the set of roller panels is configured for shielding the user positioned on the seat of the wheelchair, the roller panels being transparent, such that the user can see through the roller panels, the set of roller panels comprising:
a pair of side screens engaged singly to the sidebars, and
a front screen engaged to the end bar.

* * * * *